United States Patent
Duncan

[11] Patent Number: 5,988,191
[45] Date of Patent: Nov. 23, 1999

[54] HOLDER FOR OPHTHALMIC LENSES AND LENS BLOCKS

[75] Inventor: Rod Allen Duncan, Ft. Gibson, Okla.

[73] Assignee: Coburn Optical Industries, Inc., Tulsa, Okla.

[21] Appl. No.: 08/974,333

[22] Filed: Nov. 19, 1997

[51] Int. Cl.⁶ ..................................................... B08B 3/04
[52] U.S. Cl. ...................... 134/149; 134/153; 134/157; 134/902; 134/901; 211/41.18
[58] Field of Search .................... 134/149, 157, 134/153, 902, 901; 211/41.18

[56] References Cited

U.S. PATENT DOCUMENTS

| | | | |
|---|---|---|---|
| 3,964,957 | 6/1976 | Walsh | 134/159 |
| 5,286,657 | 2/1994 | Bran . | |
| 5,468,302 | 11/1995 | Thietje . | |
| 5,791,357 | 8/1998 | Hasegawa | 134/902 |
| 5,816,274 | 10/1998 | Bartram et al. | 134/902 |
| 5,839,460 | 11/1998 | Chai et al. | 134/902 |
| 5,861,066 | 1/1999 | Monipour et al. | 134/902 |

Primary Examiner—Frankie L. Stinson
Attorney, Agent, or Firm—Frank J. Catalano

[57] ABSTRACT

A holder for suspending ophthalmic lenses and lens blocks of various diameters from a rod in a lens and block cleaning machine has a frame with a horizontal base member and a pair of upright members extending upwardly, one from each end of the base member. A hanger extending from the upper ends of the upright members is adapted to suspend the frame from the rod. Pairs of pins extend forwardly from the front and rearwardly from the back of the base member along parallel spaced apart first and second axes in a horizontal plane. Arms are pivotally pinned to the upright members for rotation about axes parallel to the first and second axes from lowest positions approximately sixty degrees below horizontal to highest positions approximately sixty degrees above horizontal. Detents prevent rotation of the arms below the lowest position or above the highest position. Torsion springs connected between the upright members and the arms bias arms toward their lowest positions. Another pin extends from the other end of each arm along axes parallel to the first and second axes. The axes are located and spaced so that the arcs generated by the axes of the pins on the arms when the arms are rotated between their lowest and highest positions are above the horizontal plane and between vertical planes extending through the first and second axes.

19 Claims, 5 Drawing Sheets

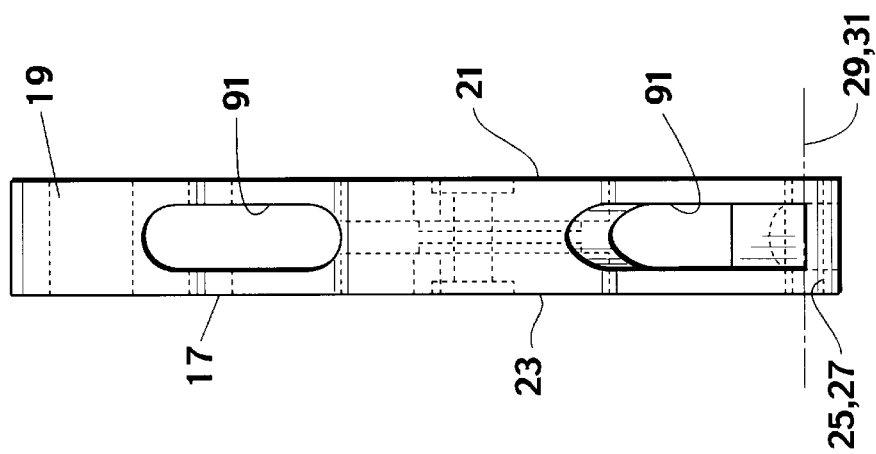
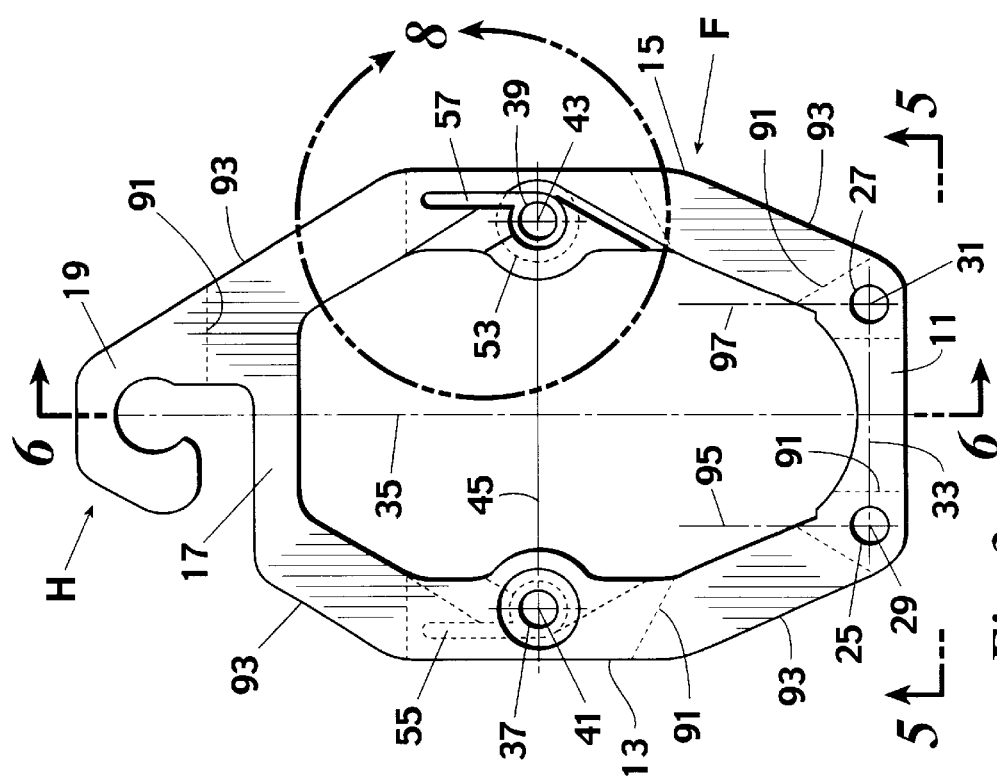
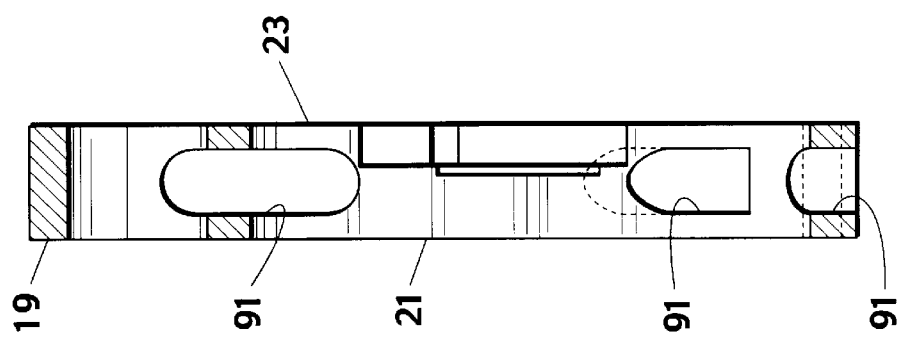

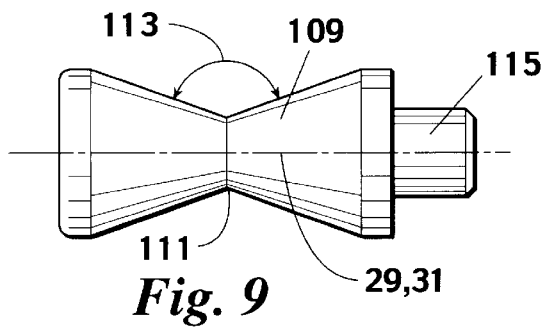
Fig. 9
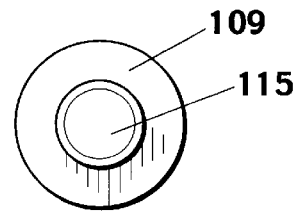
Fig. 10
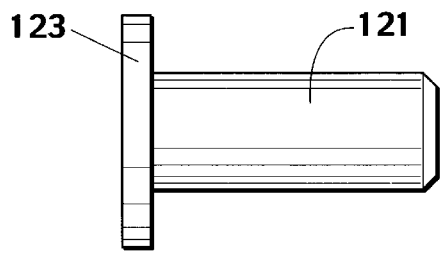
Fig. 11
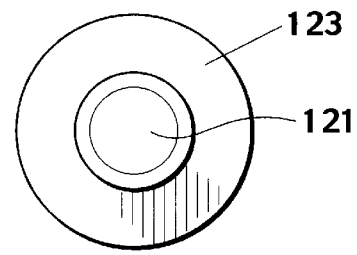
Fig. 12
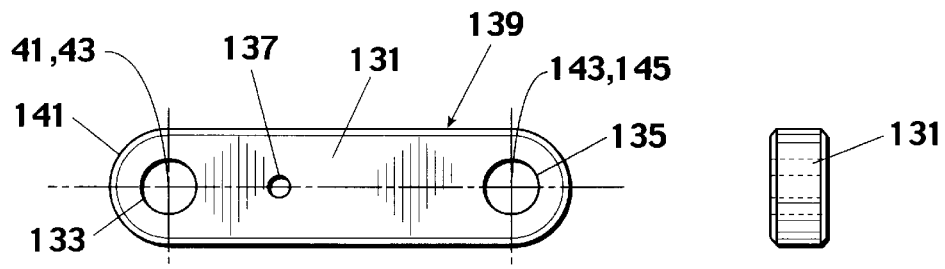
Fig. 13    Fig. 14
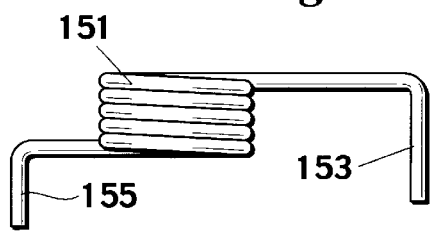
Fig. 16
Fig. 15
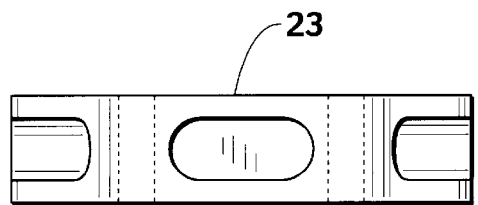
Fig. 5

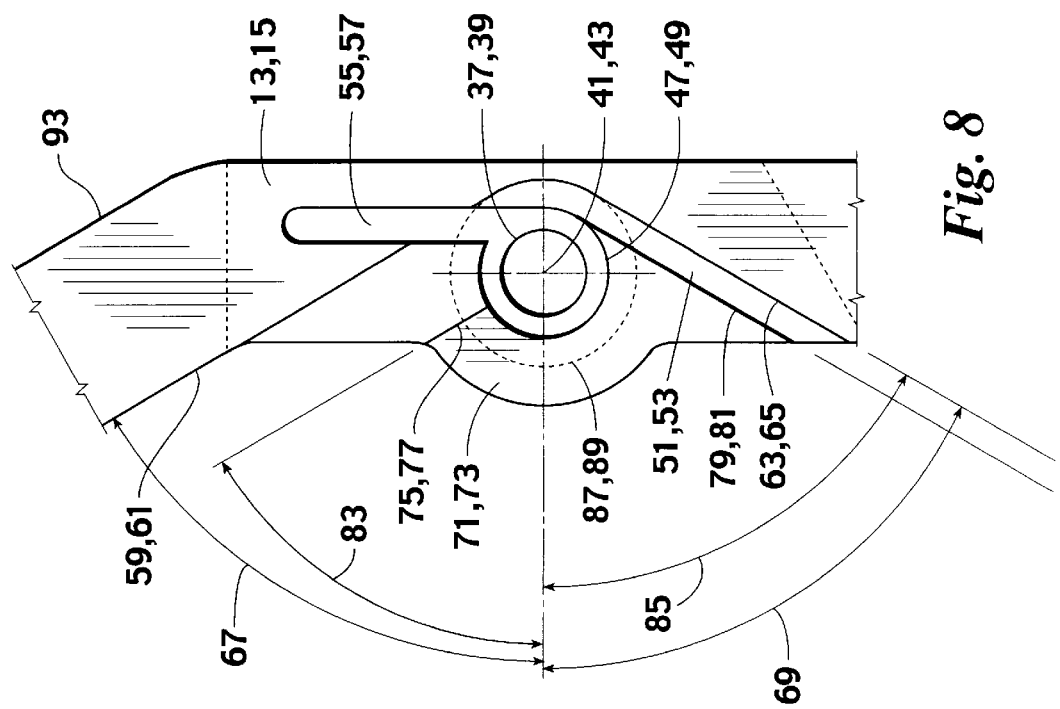
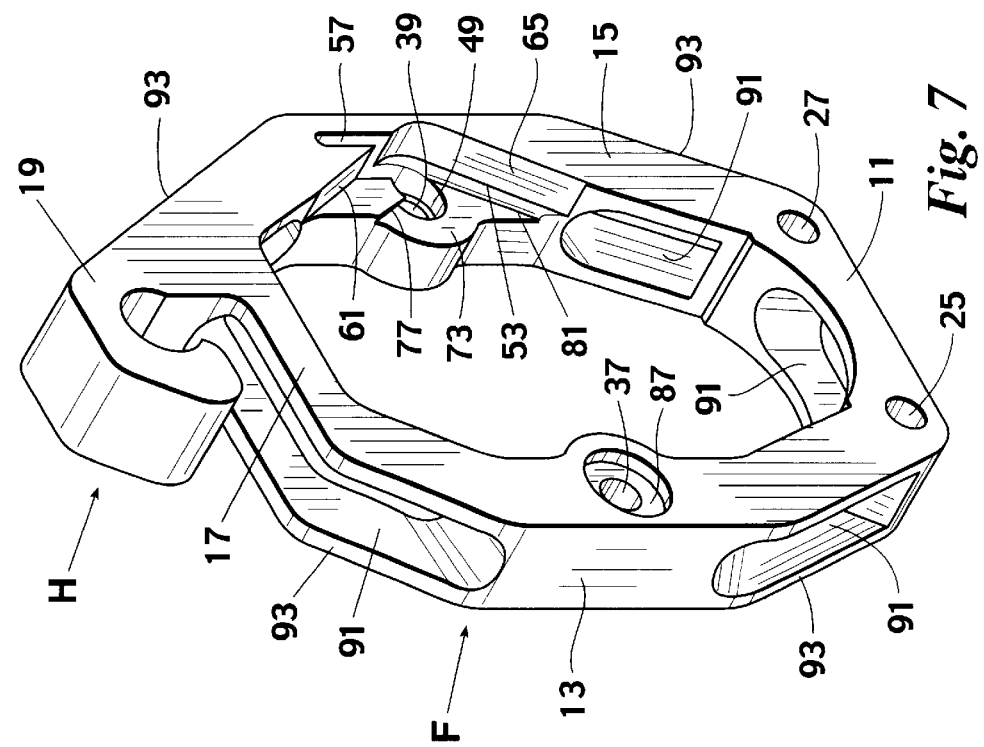

HOLDER FOR OPHTHALMIC LENSES AND LENS BLOCKS

BACKGROUND OF THE INVENTION

This invention relates generally to equipment used in the generation and finishing of ophthalmic lenses and more particularly concerns a holder for suspending ophthalmic lenses and the lens blocks used in the generation and finishing of ophthalmic lenses in a lens and lens block cleaning machine.

It has been general practice in the industry that polished lenses and used lens blocks are cleaned by hand prior to coating or reuse, respectively. The assignee of the present invention has developed a machine for the purpose of cleaning lenses and lens blocks. During development of the machine, a variety of holders have been used for supporting the lenses and lens blocks in the machine. While the presently known holders have served their purpose, it is a relatively complicated process to load the lenses into the holders, especially without touching the polished faces of the lenses during the loading and unloading process to and from the machine.

It is, therefore, a primary object of this invention to provide a holder for ophthalmic lenses and lens blocks which is easily loaded and unloaded. Another object of this invention is to provide a holder for ophthalmic lenses and lens blocks in which the loading and unloading processes do not require touching of the polished faces of the lens. It is also an object of this invention to provide a holder for ophthalmic lenses and lens blocks which is able to receive and hold lenses and blocks of a variety of diameters. A further object of this invention is to provide a holder for ophthalmic lenses and lens blocks which improves the efficiency of the lens and block cleaning machine in the lens and block cleaning process.

SUMMARY OF THE INVENTION

In accordance with the invention, a holder for suspending ophthalmic lenses and lens blocks of various diameters from a rod in a lens and block cleaning machine includes a frame, a hanger extending from an upper portion of the frame for suspending the frame from the rod, a pair of supports fixed to the front of the lower portion of the frame for supporting either a lens or a block and a mechanism pivotally connected to and biased downwardly from the frame for holding the lens or block between the pair of supports and the mechanism. Preferably, the holder is capable of holding two lenses or blanks simultaneously and, to this end, has a second pair of supports fixed to the back of the lower portion of the frame for supporting another lens or block and a second mechanism pivotally connected to and biased downwardly from the frame for holding the lens or block between the second pair of supports and the second mechanism.

In a specially preferred embodiment, the holder consists of a frame, a hanger extending from an upper portion of the frame for suspending the frame from the rod, first and second pins extending from the front of the lower portions of the frame along parallel spaced apart first and second axes in a horizontal plane, an arm pivotally pinned at one end to the frame for rotation about a third axis parallel to the first and second axes from a lowest position to a highest position approximately 120° apart, a mechanism connected between the frame and the arm for biasing the arm toward the lowest position and a third pin extending from the other end of the arm along a fourth axis parallel to the first and second axes, the third axis being located and the fourth axis being spaced from the third axis so that an arc generated by the fourth axis when the arm is rotated between the lowest and highest positions is above the horizontal plane and between vertical planes extending through the first and second axes. Preferably, the lowest position is approximately 60° below horizontal and the highest position is approximately 60° above horizontal. Also preferably, the first, second and third pins are tapered to nadirs aligned in a plane transverse to their axes. It is also preferred that the frame have one detent for preventing rotation of the arm below the lowest position and another detent for preventing rotation of the arm above the highest position. In the most preferred embodiment, the rear of the holder will be identical to the front of the holder so that two lenses or blocks can be simultaneously supported by one holder.

BRIEF DESCRIPTION OF THE DRAWINGS

Other objects and advantages of the invention will become apparent upon reading the following details description and upon reference to the drawings in which:

FIG. 3 is a front elevation view of the holder of FIG. 1 with the lower corners removed;

FIG. 4 is a side elevation view of the holder of FIG. 3;

FIG. 5 is a bottom plan view of the holder of FIG. 3;

FIG. 6 is a sectional view taken along the line 6—6 of FIG. 3;

FIG. 7 is a front perspective view of the frame and hanger of the holder of FIG. 3;

FIG. 8 is an exploded front elevation view of the area 8 designated in FIG. 3;

FIG. 9 is a side elevation view of a preferred embodiment of the supporting pins of the holder;

FIG. 10 is a rear elevation view of the pin of FIG. 9;

FIG. 11 is a side elevation view of a preferred embodiment of a pivot pin of the holder;

FIG. 12 is an end elevation view of the pivot pin of FIG. 11;

FIG. 13 is a front elevation view of a preferred embodiment of a swing arm of the holder;

FIG. 14 is an end elevation view of the swing arm of FIG. 13;

FIG. 15 is a front elevation view of a preferred embodiment of the torsion spring of the holder; and FIG. 16 is a top plan view of the torsion spring of FIG. 15.

Figure 1:
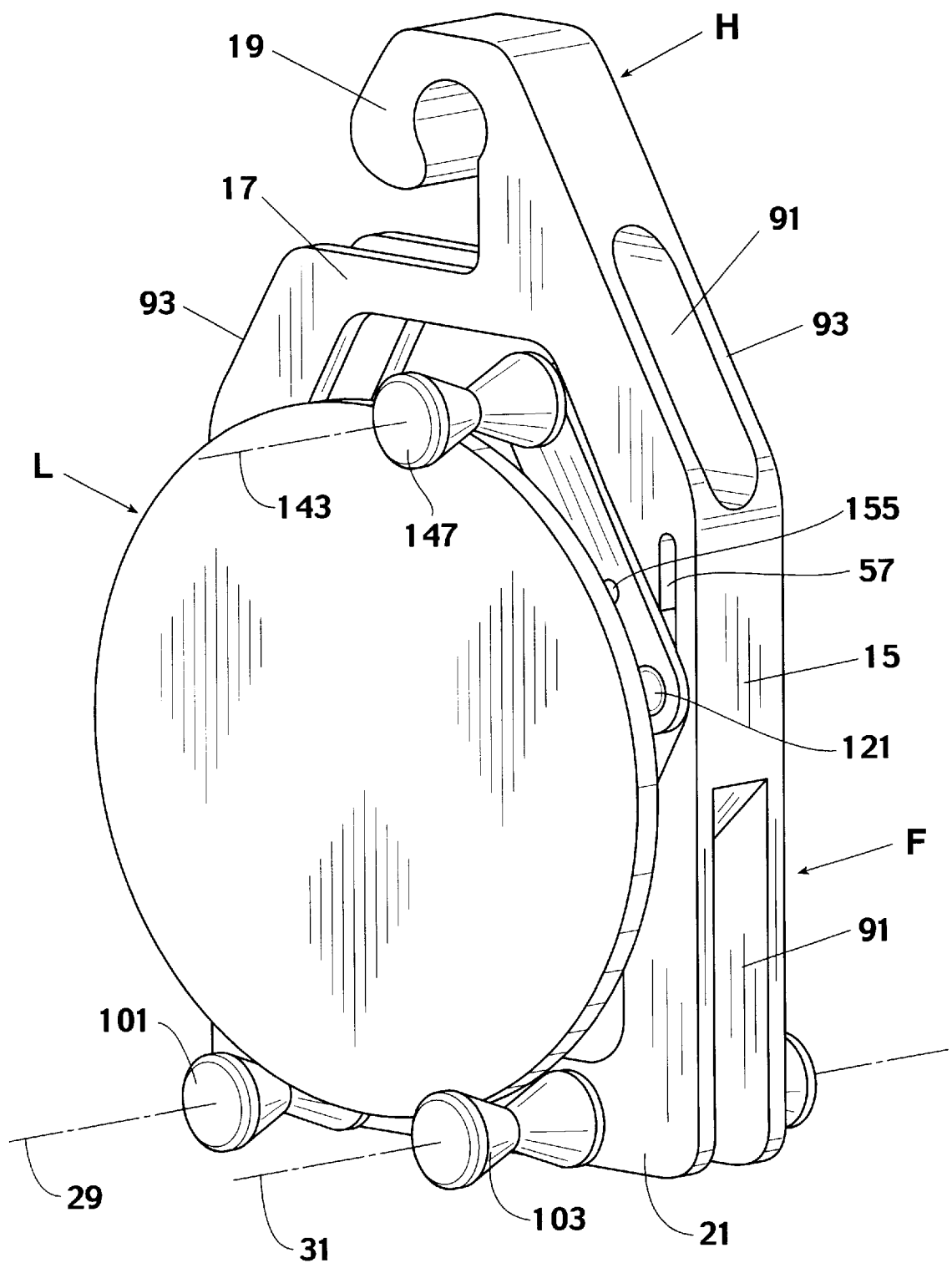
FIG. 1 is a front perspective view of a preferred embodiment of the holder with a lens mounted on the front of the holder.
Figure 2:
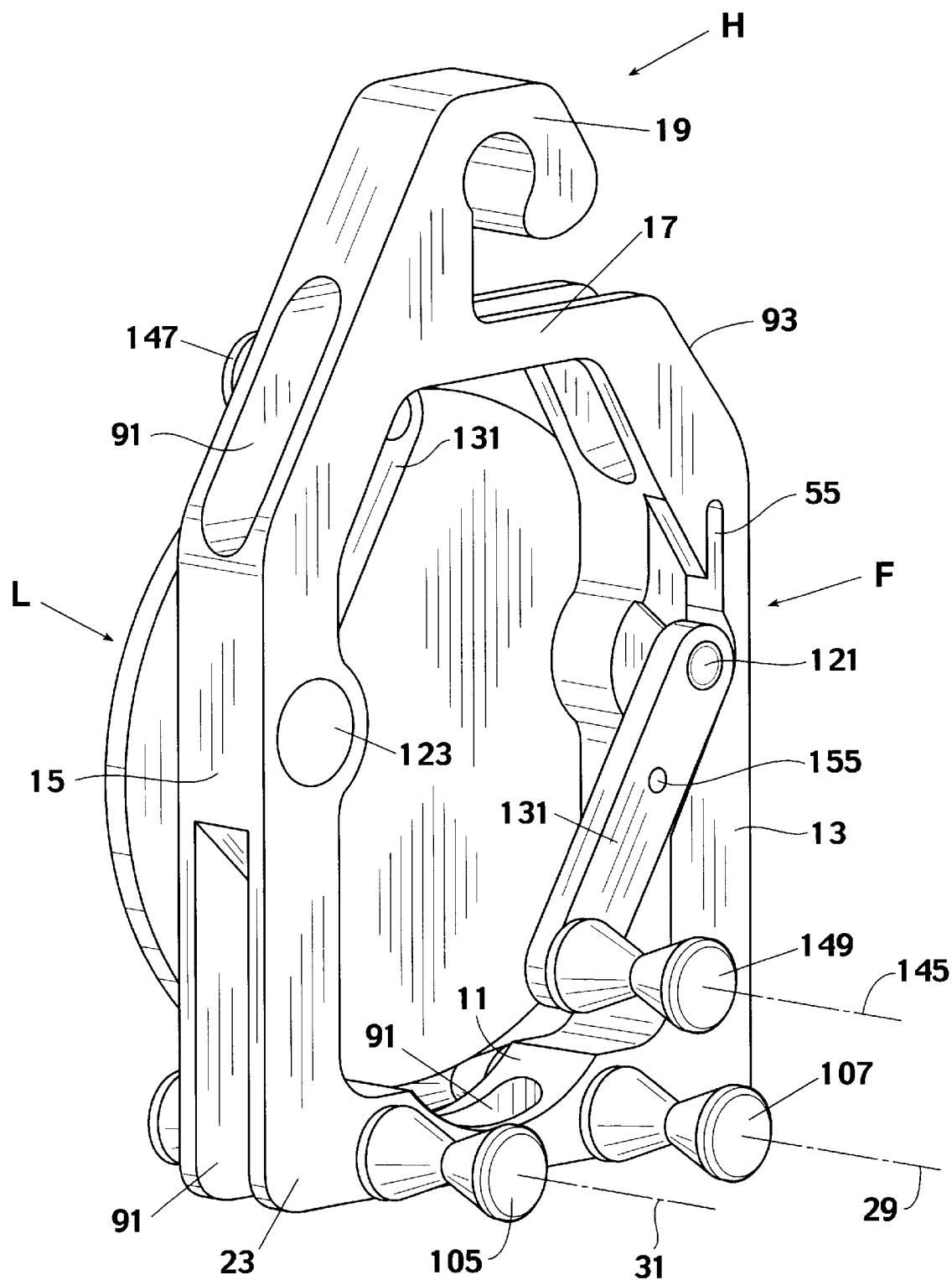
FIG. 2 is a rear perspective view of the holder of FIG. 1.

While the invention will be described in connection with a preferred embodiment, it will be understood that it is not intended to limit the invention to that embodiment. On the contrary, it is intended to cover all alternatives, modifications and equivalents as may be included within the spirit and scope of the invention as defined by the appended claims.

DETAILED DESCRIPTION

Looking at FIGS. 1 through 8, a holder for hanging an ophthalmic lens L or a lens block used in the lens making process in a lens or block cleaning machine (not shown) has a frame F which is carried on a hanger H. The frame F consists of a lower portion or base member 11 from which extend left and right upright portions or members 13 and 15, respectively. The hanger H includes a connecting member 17 extending between the upper ends of the upright and is adapted to suspend the frame F from the rod in the machine by a hook 19. The frame F and hanger H have parallel front and rear faces 21 and 23, respectively. A pair of apertures 25 and 27 are provided in the base member 11 preferably aligned on first and second parallel axes 29 and 31 lying in a horizontal plane 33. Most preferably, the first and second axes 29 and 31 are equally distant from a vertical plane 35 bisecting the frame F. Each of the upright members 13 and 15 is also provided with apertures 37 and 39, respectively, aligned on third and fifth axes 41 and 43 which are parallel to the first and second axes 29 and 31. Preferably, the third and fifth axes 41 and 43 lie in a horizontal plane 45 and most preferably are also equidistant from the vertical plane 35 bisecting the frame F. Each upright member aperture 37 and 39 has a counterbore 47 and 49, respectively. As shown, each aperture 37 and 39 and counterbore 47 and 49 extend through half the thickness of their upright members 13 and 15, preferably, the left upright member 13 having the aperture 37 and counterbore 47 in the front half of the frame F and the right upright member 15 having the aperture 39 and counterbore 49 extending through the rear half of the frame F. The other half of each upright member 13 and 15 in the area of the apertures 37 and 39 is removed to provide a shelf 51 or 53 in the respective upright member 13 or 15. As can best be seen in FIG. 8, each of the counterbores 47 and 49 extends tangentially into a vertical slot 55 or 57 and the shelves 51 and 53 are defined by upper detent faces 59 and 61 and lower detent faces 63 and 65. Preferably, the upper detent faces 59 and 61 are disposed upwardly at a sixty degree angle 67 from the horizontal and the lower detent faces 63 and 65 are disposed downwardly from the horizontal at a sixty degree angle 69. Furthermore, each shelf 51 and 53 is provided with a subshelf 71 and 73, preferably defined by a second set of upper detent faces 75 and 77 and a second set of lower detent faces 79 and 81. Preferably, the upper subshelf detent faces 75 and 77 are disposed upwardly at a sixty degree angle 83 above the horizontal and the lower subshelf detent faces 79 and 81 are disposed downwardly at a sixty degree angle 85 below the horizontal. The opposite side of each upright member 13 and 15 from its shelf 51 and 53 also includes a counter bore 87 and 89, respectively, around its respective aperture 37 and 39. The holder is also provided with as many hollowed out portions 91 as can reasonably be included within the structure above described. In addition, as best can be seen in FIGS. 3 and 7, the corners 93 of the holder may be angled to further reduce the weight of the holder.

Looking now at FIGS. 1, 2 and 9 through 16, the other components of the holder are shown. First and second pins 101 and 103 are axially aligned on the first and second axes 29 and 31, respectively, and mounted in the apertures 25 and 27 in the front face 21 of the base member 11. Similarly, fourth and fifth pins 105 and 107 are aligned on the second and first axes 31 and 29, respectively, and mounted in the apertures 27 and 25 in the rear face 23 of the base member 11. As can best be seen in FIGS. 9 and 10, the pins 101, 103, 105 and 107 are identical and consist of a length of rod 109 having a forward portion tapered to a nadir 111, preferably at an angle 113 of 140° and a rear mounting portion 115, all concentric about the axis 29 or 31 with the mounting portions 115 fully inserted into the apertures 25 and 27 in the base member 11. Looking at FIGS. 11 and 12, a pivot pin 121 having a flat head 123 is concentrically aligned for insertion into the apertures 37 and 39 in the upright members 13 and 15 with the heads 123 seated in the counterbores 87 and 89 in the upright members 13 and 15. Arms 131 illustrated in FIGS. 13 and 14 have apertures 133 and 135 at either end. Preferably, the diameter of the apertures 133 and 135 in the arms 131 and is slightly less than the diameter of the mounting portion 115 of the tapered pins 101, 103, 105 and 107 to allow for a press fit. A smaller aperture 137, preferably aligned between the end apertures 133 and 135 and closer to one than the other, is also provided through the arms 131. The aperture 133 closest to the smaller aperture 137 is fitted over the pivot pin 121. The width 139 and radius of curvature 141 of the arms 131 is such that, when mounted on the pivot pin 121, the arm 131 is seated in its respective shelf 51 or 53 of its upright member 13 or 15 and rotates about its axis 41 or 43 from an upmost position in which the arm 131 is in abutment with the upper detent 59 or 61 to a lowermost position in which the arm 131 is in abutment with the lower detent 63 or 65. Mounted on each pivot pin 121 is a torsion spring 151 which is seated in the counterbore 47 or 49 in its upright member 13 or 15. The ends of the torsion spring 151 extend tangentially from its coils and are bent into L-shaped ends 153 and 155. One end 153 is seated in its vertical slot 55 or 57 in its respective upright member 13 or 15. The other end 155 slides in the subshelf 71 or 73 of its respective upright member 13 or 15 and has its bent portion inserted into the smaller aperture 137 of its respective arm 131. The torsion spring 151 biases the arm 131 with which it is engaged toward the lowermost position in which the arm 131 is in abutment with the lower detent 63 or 65. As the arm 131 rotates between the lower detent 63 or 65 and the upper detent 59 or 61, the end 155 of the spring 151 rotates between abutment with the lower second detent 79 or 81 to abutment with the second upper detent 75 or 77. The distance between the apertures 133 and 135 in the arm 131 is such that, when the arm 131 is mounted on its pivot pin 121, the axes 143 and 145 extending through the opposite end aperture 135, when rotated over an arc of 120° as the arm 131 rotates between its detents, is above the horizontal plane 33 and between vertical planes 95 and 97 extending through the first and second axes 29 and 31. Inserted into the non-pivot pin end aperture 135 of each arm 131 is a third or sixth holding pin 147 or 149, as can best be seen in FIGS. 1 and 2. Preferably, the holding pins 147 and 149 are identical to the supporting pins 101, 103, 105 and 107 shown in FIGS. 9 and 10, except that the mounting portion 115 will have a length which coincides with the thickness of the arm 131.

In operation, with no lens L or block mounted on the holder, the arms 131 are in their lowermost positions. For example, the arm 131 on the rear of the holder is shown in its lowermost position in FIG. 2. With the arm 131 in this lowermost position, the operator can take a lens L or block and, while grasping it between the thumb, index finger and middle finger of the right hand along the edges of the lens L or block, rotate the holding pin 147 or 149 with the thumb toward its uppermost position while simultaneously sliding the lens L or block into a seated position on the lower support pins 101 and 103 or 105 and 107. Once the lens L or the block is inserted between its three associated pins, the bias of the torsion spring 151 forces the holding pin downwardly against the edge of the lens L or the block and positions the lens L or the block with its edges seated in the nadirs 111 of its associated pins. FIG. 1 illustrates the lens L loaded into this position on the front of the holder. To unload the lens L or block, its edges are grasped between the thumb and the forefinger and the lens L or block moved laterally and slightly upwardly to raise the arm 131 toward its uppermost position, thus releasing the lens L or block for further lateral movement out of engagement with its three associated pins. When the lenses L and/or blocks have been loaded onto the holder, the holder is suspended by the hanger H on the rod of the machine. The machine enclosure is closed and the washing process initiated. Hollowed out portions 91 and angled corners 93 not only reduce the weight of the holder but also permit easier attack of the lens L or block by the bath of cleaning fluid within the machine.

The holder has been described in relation to an embodiment convenient for use by a right handed operator, that is with the lens L or block and the arm 131 being manipulated by the right hand. An opposite hand device convenient for left handed operators is within the purview of the invention. Furthermore, the holder may be configured to accommodate mounting of a lens L or block on only one side of the holder. Furthermore, the general symmetry of the holder is preferred but is not necessary, provided that the arc of the holding pin axis extends between the vertical planes through the supporting pin axes and above the horizontal plane through the supporting pin axes. While the hook arrangement of the hanger H is preferred, any known means of suspending a frame from a supporting rod may be employed. Preferably the frame, hanger, arms, support pins and holding pins are of Delrin or other suitable polymer and the pivot pins are of stainless steel.

Thus, it is apparent that there has been provided, in accordance with the invention, a holder for ophthalmic lenses and lens blocks that fully satisfies the objects, aims and advantages set forth above. While the invention has been described in conjunction with specific embodiments thereof, it is evident that many alternatives, modifications and variations will be apparent to those skilled in the art and in light of the foregoing description. Accordingly, it is intended to embrace all such alternatives, modifications and variations as fall within the spirit of the appended claims.

What is claimed is:

1. A holder for suspending ophthalmic lenses and lens blocks of various diameters from a rod in a lens and block cleaning machine comprising:
   a frame;
   means extending from an upper portion of said frame for suspending said frame from the rod;
   means fixed to a front face of a lower portion of said frame for supporting one of a lens and a block; and
   means pivotally connected to and biased downwardly from said frame for holding the one of a lens and a block between said supporting means and said holding means.

2. A holder according to claim 1 further comprising:
   second means fixed to a back face of a lower portion of said frame for supporting another of a lens and a block; and
   second means pivotally connected to and biased downwardly from said frame for holding the another of a lens and a block between said second supporting means and said second holding means.

3. A holder for suspending ophthalmic lenses and lens blocks of various diameters from a rod in a lens and block cleaning machine comprising:
   a frame;
   means extending from an upper portion of said frame for suspending said frame from the rod;
   first means fixed to a front of a lower portion of said frame for supporting one of a lens and a block;
   first means pivotally connected to and biased downwardly from said frame for holding the one of a lens and a block between said first supporting means and said first holding means;
   second means fixed to a back of a lower portion of said frame for supporting another of a lens and a block; and
   second means pivotally connected to and biased downwardly from said frame for holding the another of a lens and a block between said second supporting means and said second holding means.

4. A holder for suspending ophthalmic lenses and lens blocks of various diameters from a rod in a lens and block cleaning machine comprising:
   a frame;
   means extending from an upper portion of said frame for suspending said frame from the rod;
   first and second pins extending from a front of a lower portion of said frame along parallel spaced apart first and second axes, respectively, in a horizontal plane;
   an arm pivotally pinned at one end thereof to said frame for rotation about a third axis parallel to said first and second axes from a lowest position to a highest position approximately 120 degrees apart;
   means connected between said frame and said arm for biasing said arm toward said lowest position; and
   a third pin extending from another end of said arm along a fourth axis parallel to said first and second axes, said third axis being located and said fourth axis being spaced from said third axis so that an arc generated by said fourth axis when said arm is rotated between said lowest and highest positions is above said horizontal plane and between vertical planes extending through said first and second axes.

5. A holder according to claim 4, said lowest position being approximately 60 degrees below horizontal and said highest position being approximately 60 degrees above horizontal.

6. A holder according to claim 4, said first, second and third pins being tapered to nadirs aligned in a plane transverse to said axes.

7. A holder according to claim 4, said frame having detent means thereon for preventing rotation of said arm below said lowest position.

8. A holder according to claim 4, said frame having detent means thereon for preventing rotation of said arm above said highest position.

9. A holder according to claim 4 further comprising:
   fourth and fifth pins extending from a back of said lower portion of said frame along said first and second axes;
   a second arm pivotally pinned at one end thereof to said frame for rotation about a fifth axis parallel to said first and second axes from a lowest position to a highest position less than 120 degrees apart;
   second means connected between said frame and said second arm for biasing said second arm toward said lowest position; and
   a sixth pin extending from another end of said second arm along a sixth axis parallel to said first and second axes, said fifth axis being located and said sixth axis being spaced from said fifth axis so that an arc generated by said sixth axis when said second arm is rotated between said lowest and highest positions is above said horizontal plane and between vertical planes extending through said first and second axes.

10. A holder according to claim 9, said lowest position being approximately 60 degrees below horizontal and said highest position being approximately 60 degrees above horizontal.

11. A holder according to claim 9, said fifth axis being horizontally oppositely equidistant from a vertical plane bisecting said space between said first and second axes as said third axis.

12. A holder according to claim 9, said first, second and third pins being tapered to nadirs aligned in one plane transverse to said axes and said fourth, fifth and sixth pins being tapered to nadirs aligned in another plane transverse to said axes.

13. A holder according to claim 9, said frame having first and second detent means thereon for preventing rotation of said arm and said second arm, respectively, below said lowest positions.

14. A holder according to claim 9, said frame having first and second detent means thereon for preventing rotation of said arm and said second arm, respectively, above said highest positions.

15. A holder according to claim 9, said frame having at least one hollowed out portion defining a cleaning fluid passage through said frame.

16. A holder according to claim 9, said supporting means having at least one hollowed out portion defining a cleaning fluid passage through said frame.

17. A holder for suspending ophthalmic lenses and lens blocks of various diameters from a rod in a lens and block cleaning machine comprising:

a frame having a horizontal base member and a pair of upright members extending upwardly, one from each end of said base member;

a hanger extending from upper ends of said upright members and adapted to suspend said frame from the rod;

first and second pins extending forwardly from a front of said base member along parallel spaced apart first and second axes, respectively, in a horizontal plane;

a first arm pivotally pinned at one end thereof to one of said upright members for rotation about a third axis parallel to said first and second axes from a lowest position approximately 60 degrees below horizontal to a highest position approximately 60 degrees above horizontal;

a first detent for preventing rotation of said first arm below said lowest position;

a first torsion spring connected between said one of said upright members and said first arm biasing said first arm toward said lowest position; and a third pin extending from another end of said first arm along a fourth axis parallel to said first and second axes, said third axis being located and said fourth axis being spaced from said third axis so that an arc generated by said fourth axis when said first arm is rotated between said lowest and highest positions is above said horizontal plane and between vertical planes extending through said first and second axes;

fourth and fifth pins extending from a back of said base member along said first and second axes;

a second arm pivotally pinned at one end thereof to another of said upright members for rotation about a fifth axis parallel to said first and second axes from a lowest position approximately 60 degrees below horizontal to a highest position approximately 60 degrees above horizontal, said fifth axis being horizontally oppositely equidistant from a vertical plane bisecting said space between said first and second axes as said third axis;

a second torsion spring connected between said another of said upright members and said second arm for biasing said second arm toward said lowest position; and a sixth pin extending from another end of said second arm along a sixth axis parallel to said first and second axes, said fifth axis being located and said sixth axis being spaced from said fifth axis so that an arc generated by said sixth axis when said second arm is rotated between said lowest and highest positions is above said horizontal plane and between vertical planes extending through said first and second axes.

18. A holder according to claim 17, said frame having at least one hollowed out portion defining a cleaning fluid passage through said frame.

19. A holder according to claim 17, said hanger having at least one hollowed out portion defining a cleaning fluid passage through said frame.

* * * * *